United States Patent
Stark et al.

(10) Patent No.: US 6,369,123 B1
(45) Date of Patent: Apr. 9, 2002

(54) RADIATION-CROSSLINKABLE ELASTOMERS AND PHOTOCROSSLINKERS THEREFOR

(75) Inventors: Peter A. Stark, Cottage Grove; Edward G. Stewart, White Bear Lake; Albert I. Everaerts, Oakdale, all of MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 08/514,677

(22) Filed: Aug. 14, 1995

(51) Int. Cl.$^7$ ............ C08J 3/28; C08G 77/38; C08F 8/00; C08F 8/28; C08F 8/30; C08F 8/34

(52) U.S. Cl. ............ 522/36; 522/38; 522/39; 522/46; 522/63; 522/64; 522/74; 522/81; 522/82; 522/83; 522/33; 522/126; 522/127; 522/130; 522/134; 522/146; 522/148

(58) Field of Search ............ 522/36, 39, 46, 522/63, 38, 64, 126, 130, 146, 33, 74, 81, 82, 83, 127, 134, 148

(56) References Cited

U.S. PATENT DOCUMENTS

| | | | |
|---|---|---|---|
| 3,214,492 A | 10/1965 | Tucker | 522/905 |
| 3,265,772 A | 8/1966 | Tucker | 522/905 |
| 3,865,597 A | 2/1975 | Broyde | 252/500 |
| 3,948,667 A | 4/1976 | Ichikawa | 522/159 |
| 4,040,923 A | 8/1977 | Pacifici | 522/46 |
| 4,165,266 A | 8/1979 | Stueben | 428/483 |
| 4,329,384 A | 5/1982 | Vesley et al. | 428/40 |
| 4,330,590 A | 5/1982 | Vesley | 428/336 |
| 4,379,201 A | 4/1983 | Heilmann et al. | 428/345 |
| 4,391,678 A | 7/1983 | Freeman | 204/15 |
| 4,602,097 A | 7/1986 | Curtis | 549/27 |
| 4,670,309 A | 6/1987 | Okada et al. | 427/387 |
| 4,737,559 A | 4/1988 | Kellen et al. | 526/291 |
| 5,002,975 A | 3/1991 | Loza | 522/46 |
| 5,407,971 A | 4/1995 | Everaerts et al. | 522/35 |

FOREIGN PATENT DOCUMENTS

| | | | |
|---|---|---|---|
| EP | 88842 | 9/1983 | ........ 522/905 |
| GB | 1223463 | 2/1971 | |
| GB | 2 280 905 A | 2/1995 | ........ C08F/2/50 |
| JP | 22373/1977 | 1/1977 | ........ C08L/23/02 |
| JP | 57-125204 | 8/1982 | ........ C08F/2/50 |
| JP | 04/074172 | 3/1992 | ........ C07D/195/10 |
| JP | 54/057560 | 5/1997 | ........ C08L/67/02 |

OTHER PUBLICATIONS

M. Gleria et al, "Photochemical Behavior of Poly(organophosphazenes). 4. Photosensitization Properties of Poly[bis(4–benzoylphenoxy)phosphazene]," *Macromolecules* 1986, vol. pp. 574–578.

Inque, "Novel UV Absorbers Prepared from 2,4–Dihydroxybenzophenone and Hexachlorocyclotriphosphazene," *Journal of Applied Polymer Science* 1993, pp. 1857–1862.

Gleria et al., "Photochemical Behavior of Poly(organophosphazenes). 5. Photochemistry of Poly[bis(benzoylphenoxy) phosphazene], [NP(OC$_6$H$_4$COC$_6$H$_5$)$_2$ ]$^n$, in Solution, "*Macromolecules* 1987, vol. 20, No. 8, pp. 1766–1770.

Derwent Abstract 92–129045. "New Aryl Ketones . . . ", Kao Corp.

Parker et al., "II. Photoaffinity Probes . . . ", *Journal of Protein Chemistry*, vol. 3, Nos. 5/6, 1985, pp. 479–489.

*Primary Examiner*—Susan W. Berman
(74) *Attorney, Agent, or Firm*—Gregory A. Evearitt; Steven E. Skolnick; Philip Y. Dahl

(57) ABSTRACT

Radiation-crosslinkable elastomeric compositions containing:

(a) an elastomeric polymer containing abstractable hydrogen atoms in an amount sufficient to enable the elastomeric polymer to undergo crosslinking in the presence of a suitable radiation-activatable crosslinking agent; and (b) a radiation-activatable crosslinking agent of the formula:

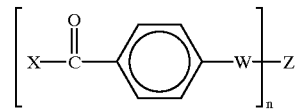

wherein:

X represents $CH_3$—; phenyl; or substituted-phenyl; or substituted-phenyl with the proviso that any substituents on the substituted-phenyl do not interfere with the light-absorbing capacity of the radiation-activatable crosslinking agent and do not promote intramolecular hydrogen abstraction of the radiation activatable crosslinking agent;

W represents —O—, —NH—, or —S—;

Z represents an organic spacer selected from the group consisting of aliphatic, aromatic, aralkyl, heteroaromatic, and cycloaliphatic groups free of esters, amides, ketones, urethanes, and also free of ethers, thiols, allylic groups; and benzylic groups with hydrogen atoms intramolecularly accessible to the carbonyl group(s) present in the radiation-activatable crosslinking agent; and n represents an integer of 2 or greater. Further disclosed are novel photocrosslinkers based upon 2,4,6-tri(4-benzoylphenoxy)-1,3,5-triazines.

16 Claims, No Drawings

RADIATION-CROSSLINKABLE ELASTOMERS AND PHOTOCROSSLINKERS THEREFOR

FIELD OF THE INVENTION

This invention relates to novel radiation-activatable photocrosslinking agents. This invention also relates to radiation-crosslinkable elastomers. This invention further relates to radiation-crosslinked elastomners.

BACKGROUND OF THE ART

It is known that crosslinking of polymers produces polymer networks which have quite different mechanical and physical properties compared to their uncrosslinked linear or branched counterparts. For example, polymer networks can show such unique and highly desirable properties as solvent resistance, high cohesive strength, and elastomeric character.

Crosslinked polymers can be made in situ during formation of the desired polymer product, however, since further processing of the polymer product is often necessary, it is more typical to start from the linear or branched polymer which in the final processing step is cured to a crosslinked material. The curing or crosslinking step is typically activated by moisture, thermal energy, or radiation. The latter has found widespread applications, particularly in the use of ultraviolet light as the radiation source.

In the past, a variety of different materials have been used as crosslinking agents, e.g., polyfunctional acrylates, acetophenones, benzophenones, and triazines. The foregoing crosslinking agents, however, possess certain drawbacks which include one or more of the following: high volatility; incompatibility with certain polymer systems; generation of corrosive or toxic by-products; generation of undesirable color; requirement of a separate photoactive compound to initiate the crosslinking reaction; and high sensitivity to oxygen.

Certain polyfunctional benzophenones have been investigated as photocrosslinking agents and/or photosensitizers in various photopolymerizable systems.

JP 54/057560 discloses the use of (bis)benzophenone compounds to photocrosslink non-elastomeric materials in particular, polyester compositions. When incorporated into polyesters, they impart improved tensile strength and elongation to biaxially stretched films of crosslinked poly (ethylene terephthalate). These films also exhibit enhanced weather, heat, and chemical resistance and improved dimensional stability.

U.S. Pat. No. 4,602,097 (Curtis) discloses the use of (bis)benzophenones as photoinitiators and/or photosensitizers in radiation-cured coatings. The poly(ethylene oxide) moiety which separates the terminal benzophenone groups allows the claimed compositions to be more soluble than unsubstituted-benzophenones in waterborne coating compositions. The (bis)benzophenone compounds, however, contain hydrogen donating groups, such as the methylenes adjacent to the oxygen atoms of the ether functionalities. These hydrogen donating groups undergo an intramolecular hydrogen abstraction by the photochemically excited (bis) benzophenone structure to provide a lower energy radical which is effective as an initiator, but unsuitable as a photocrosslinker.

PCT Patent Appln. WO 93/16131 and U.S. Pat. No. 5,407,971 (Everaerts et al.) describes a radiation-crosslinkable elastomeric composition containing: (a) an elastomeric polymer containing abstractable hydrogen atoms in an amount sufficient to enable the elastomeric polymer to undergo crosslinking in the presence of a suitable radiation-activatable crosslinking agent; and (b) a radiation-activatable polyfunctional acetophenone or benzophenone crosslinking agent. According to Formula (1) of this application, if substituent "W" is present (i.e., the aceto- or benzophenone moieties of these crosslinkers have an ether, thioether or amino linkage), then an internal ketone, ester or amide functionality (i.e., substituent "Y") must also be present. From a synthetic standpoint, such crosslinkers are prepared in a reaction sequence involving at least two steps. The first step involves preparation of an acetophenone- or benzophenone-functional alkyl ester derivative. The second step involves the reaction of this of this alkyl ester with either short chain or higher molecular weight nucleophiles. Additional reaction steps may also be required if other functionalities, such as urethane groups, are desired in spacer "Z".

U.S. Pat. No. 4,379,201 (Heilmann et al.) is an example of a class of polyacrylic-functional crosslinkers used in the photocuring of (meth)acrylate copolymers. U.S. Pat. No. 4,391,678 (Vesley) and U.S. Pat. No. 4,330,590 (Vesley) describe a class of fast curing triazine photocrosslinkers which, when mixed with an acrylic monomer and, optionally, a monoethylenically unsaturated monomer, and exposed to UV radiation, forms a crosslinked polyacrylate. The crosslinks formed by both the (meth)acrylates and the triazines in these copolymerizations prevent any further processing, such as hot melt coating, reactive extrusion, or solution coating processes, following the initial photopolymerization.

U.S. Pat. No. 4,737,559 (Kellen et al.) discloses acrylate-functional aromatic ketones (in particular, 4-acryloxybenzophenone "ABP") which are incorporated with other (meth)acrylate monomers to form pressure-sensitive adhesive copolymers containing pendant benzophenone groups. These benzophenone functional pressure-sensitive adhesive copolymers undergo efficient crosslinking upon exposure to UV light, especially when compared to the use of conventional benzophenones as a photocrosslinker. This patent also specifically states that the disclosed compounds must be free of hydroxy groups in a position ortho to the carbonyl functionality. These hydroxy substituents inhibit free-radical formation and hydrogen abstraction from the acrylate copolymer backbone. However, since these acrylate-functional aromatic ketones are monomers to be copolymerized primarily with other acrylic monomers, they are not usefull as a post-polymerization photocrosslinker which may be compounded with previously prepared elastomeric polymers of varying chemical character.

There is a strong desire to be able to crosslink adhesive systems after all processing requirements have been accomplished. As the industry moves towards the use of hot-melt adhesives and away from solvent-based coatings, this requirement becomes even more important. Many approaches and polymer types have been studied to obtain the desired properties. E-beam and UV radiation curing have been leading the way with respect to post-radiation curing. There are problems associated with both routes and no universal solution is currently apparent.

It was against the foregoing background that a search for improved radiation-crosslinkable materials and radiation-activatable crosslinking agents was conducted.

SUMMARY OF THE INVENTION

In accordance with one embodiment of the present invention, there is provided a radiation-crosslinkable composition comprising: (a) an elastomeric polymer containing abstractable hydrogen atoms in an amount sufficient to enable the elastomeric polymer to undergo crosslinking in the presence of a suitable radiation-activatable crosslinking agent; and (b) a radiation-activatable crosslinking agent of the formula:

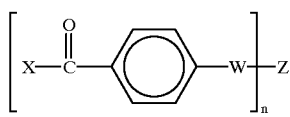
(I)

wherein:

X represents $CH_3$—; phenyl; or substituted-phenyl with the proviso that any substituents on the substituted-phenyl do not interfere with the light-absorbing capacity of the radiation-activatable crosslinking agent and do not promote intramolecular hydrogen abstraction of the radiation activatable crosslinking agent;

W represents —O—, —NH—, or —S—;

Z represents an organic spacer selected from the group consisting of aliphatic, aromatic, aralkyl, heteroaromatic, and cycloaliphatic groups free of esters, amides, ketones, and urethanes, and also free of ethers, thiols, allylic groups, and benzylic groups with hydrogen atoms intramolecularly accessible to the carbonyl group in formula (I); and n represents an integer of 2 or greater; preferably 2–6.

It is also within the spirit and scope of the present invention that the phenylene ring of formula (I) linking a carbonyl group and "W" can also contain one or more substituents which do not interfere with the light-absorbing capacity of the crosslinking agent and which do not promote intramolecular hydrogen abstraction of the elastomer.

It is also within the spirit and scope of the present invention that the organic spacer Z of formula (I) may contain a minimal number of esters, amides, ketones, and urethanes within its internal structure, and not as terminal groups, which contain some abstractable hydrogen atoms, yet do not lead to "intramolecular backbiting" of the radiation-activatable crosslinking agent formula (I).

In one preferred embodiment of the present invention, the radiation-activatable crosslinking agent used in the radiation-crosslinkable elastomer is of the formula (I) above wherein X is phenyl; W is oxygen; Z is —(CH$_2$)$_{2-12}$; and n is 2.

In another preferred embodiment of the present invention, the radiation-activatable crosslinking agent used in the radiation-crosslinkable elastomer has the formula (II) shown below:

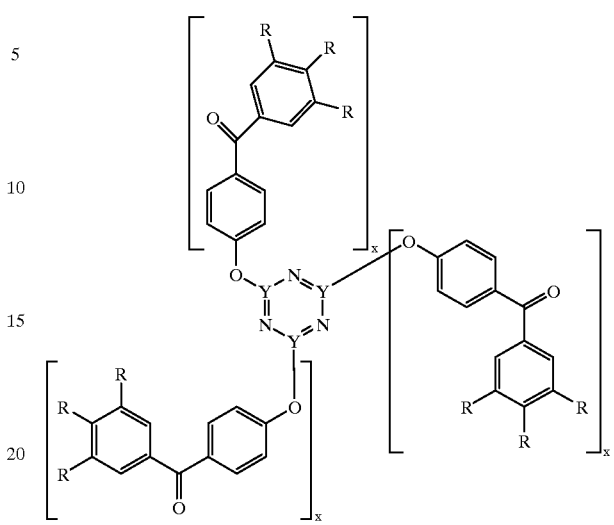
(II)

wherein: Y represents carbon or phosphorus, each R substituent independently represents hydrogen; $C_1$ to $C_6$ alkyl; $C_1$ to $C_6$ alkoxy; or halogen; and x is 1 or 2, with the proviso that when Y is carbon, x must equal 1 and when Y is phosphorus, x must equal 2.

So far as is known, no one has previously utilized any of the above-disclosed radiation-activatable polyfunctional acetophenones and benzophenones as crosslinking agents for elastomeric polymers. Additionally, the use of the above-disclosed polyfunctional acetophenones and benzophenones affords a number of advantages as compared to the use of conventional crosslinking agents for elastomers. These advantages include, but are not limited to, lowered volatility of the crosslinking agent due to its higher molecular weight; increased compatibility of the crosslinker through the selection of the organic spacer; decreased sensitivity of the crosslinkable composition to oxygen; the avoidance of evolution of any toxic or corrosive by-products or discoloration of the final product; and the capability to be used as a post-curing crosslinking additive. Furthermore, the crosslinking agents for elastomeric polymers of the present invention have the following advantages over previously described polyfunctional acetophenones and benzophenones; ease of synthesis; improved crosslinking efficiency; lower cost starting materials; and optional inclusion of substitution on the benzophenone group.

The classes of radiation-activatable crosslinkers represented by formula (II) are 2,4,6-tri(4-benzoylphenoxy)-1,3,5-triazines and hexakis(4-benzoylphenoxy)-1,3,5-phosphazenes which can be synthesized in one step from commercial starting materials. The UV-visible spectra of these multifunctional benzophenone photocrosslinkers generally have greater range and extinction coefficients greater than conventional benzophenones. They are non-volatile, non-HCl producing, non-photoyellowing, and photocrosslink under both high and low intensity UV light.

In another embodiment of the present invention, novel photoactivatable crosslinkers are provided. They are 2,4,6-tri(4-benzoylphenoxy)-1,3,5-triazines based upon formula (II) wherein Y represents carbon, x is 1, and R is as defined previously.

Other aspects, advantages, and benefits of the present invention are apparent from the detailed description, the examples, and the claims.

DETAILED DESCRIPTION OF THE INVENTION

The radiation-crosslinkable compositions used in the present invention are elastomeric polymers ("elastomers") which contain abstractable hydrogen atoms. The abstractable hydrogen atoms will be present in the backbone and/or side chains of the elastomer in an amount sufficient to allow crosslinking of the elastomer upon exposure of the photocrosslinkinig agent/elastomer mixture to radiation, e.g., electromagnetic radiation, such as ultraviolet ("UV") light. As a general rule, hydrogen atoms are most easily abstracted from tertiary carbon atoms, allylic and benzylic groups, those hydrogens on carbon atoms in a position alpha to an oxygen or nitrogen atom (e.g., organic ethers and tertiary amines), and those elastomners with terminal or pendant mercapto groups.

In the present invention, an elastomeric polymer or elastomer is defined as being a macromolecular material that returns rapidly to its approximate initial dimensions and shape after substantial deformation by a weak stress and subsequent release of that stress as measured according to ASTM D 1456–86 ("Standard Test Method For Rubber Property-Elongation At Specific Stress"). Examples of elastomers which can be used in the present invention include, but are not limited to, styrene-butadiene rubber (SBR), styrene-isoprene-styrene block copolymers (SIS), styrene-butadiene-styrene block copolymers (SBS), ethylene-propylene-diene monomer rubbers (EPDM), polyisobutylene, natural rubber, synthetic polyisoprene, polybutadiene, acrylonitrile-butadiene copolymers, polychloroprene, ethylene-vinylacetate, poly($\alpha$-olefins), poly(vinyl ethers), poly(vinyl esters), polymethacrylates, and polyacrylates. The preferred elastomers for use in the present invention are polyacrylates, natural rubber, polybutadiene, polyisoprene, SBS block copolymers, and SIS block copolymers.

The radiation-activatable crosslinking agents utilized in radiation-crosslinkable elastomer of the present invention have the following formula:

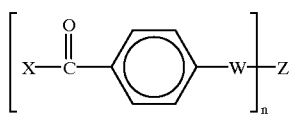

(I)

wherein:
X represents $CH_3$—; phenyl; or substituted-phenyl with the proviso that any substituents on the substituted-phenyl do not interfere with the light-absorbing capacity of the radiation-activatable crosslinking agent and do not promote intramolecular hydrogen abstraction of the radiation-activatable crosslinking agent;

W represents —O—, —NH—, or —S—;

Z represents an organic spacer selected from the group consisting of aliphatic, aromatic, aralkyl, heteroaromatic, and cycloaliphatic groups free of esters, amides, ketones, urethanes, and also free of ethers, thiols, allylic groups, and benzylic groups with hydrogen atoms intramolecularly accessible to the carbonyl group in formula (I); and n represents an integer of 2 or greater; preferably 2–6.

Substituents on any phenyl or phenylene rings of formula (I) which would interfere with the light-absorbing capacity of the radiation-activatable crosslinking agent are those which are chromophoric in nature and absorb light in the range of about 240 to 400 nm and preferably, about 290–350 nm, with extinction coefficients larger than the corresponding absorptions in unsubstituted Formula (I). Examples of non-light absorbing substituents include halogen, alkoxy, and alkyl substituents.

Phenyl or phenylene substituents in formula (I) should also be free of intramolecularly accessible, readily abstractable hydrogens which are present in such functionalities as ethers, thiols, allylic groups, benzylic groups, tertiary amines, and the like to prevent or limit the incidence of deleterious intramolecular reactions.

The foregoing crosslinking agents of formula (I) can be synthesized according to reactions well known to those skilled in the art of synthetic organic chemistry, e.g., an $S_N2$ nucleophilic aliphatic substitution reaction between 4-substituted-benzophenone, 4-substituted-acetophenone, or derivatives thereof with halofunctional aliphatic, aromatic, aralkyl, heteroaromatic, and cycloaliphatic compounds free of urethanes, esters, amides, ketones, and also free of ethers, thiols, allylic groups, and benzylic groups with hydrogen atoms intramolecularly accessible (defined herein later) to the carbonyl group in formula (I).

Organic spacer segments Z and phenyl or phenylene substituents in formula (I) may be prepared to enhance the compatibility and decrease the volatility of the polyfunctional photocrosslinking agents in varying polymeric systems. For example, organic spacer segment Z and phenyl or phenylene substituents in formula (I) can be selected to enhance the aliphatic character of the typically aromatic benzophenone or acetophenone moieties. Such modification can result in photocrosslinking agents which are more compatible and efficient in elastomeric materials such as natural rubber, polybutadiene, poly($\alpha$-olefins), and the like.

The organic spacer segment Z may also be selected to modify the rheological and mechanical properties of the radiation-crosslinked materials. A rigid spacer group will result in a different rheology than a flexible spacer group. Also, the length of the spacer group may be used to control the crosslink density of the network. Although the spacing of the crosslinking points along the backbone of the elastomer may not be precisely controlled, the size and chemical nature of the linkage may be determined using the crosslinking agents disclosed herein. As the concentration of crosslinking agent decreases in the photocurable mixture, the properties of the crosslinked elastomeric network become increasingly dominated by the mechanical and rheological properties of the elastomer.

Organic spacer Z should be free of such functionalities as ethers, thiols, allylic groups, and benzylic groups with hydrogen atoms which are intramolecularly accessible to the carbonyl group in formula (I). "Intramolecular accessibility" relates to the steric, orientational and/or conformational ability of the excited carbonyl group in formula (I) to approach closely enough to the hydrogen atoms to effect the abstraction process. When such functionalities are present, irradiation will cause hydrogen abstraction at sites along the spacer segment instead of abstracting hydrogens from the elastomeric polymer backbone. This leads to an undesired intramolecular "backbiting" reaction which reduces the photocrosslinking efficiency of multifunctional crosslinkers which contain spacer segments with readily abstractable hydrogens.

In one preferred embodiment of the present invention, the radiation-activatable crosslinker used in the radiation-crosslinkable composition is of the formula (I) wherein: X is phenyl; W is oxygen; Z is $-(CH_2)_{2-12}$; and n is 2.

In another preferred embodiment of the present invention, the radiation-activatable crosslinkers used in the radiation-crosslinkable elastomeric composition are of the formula (II) shown below:

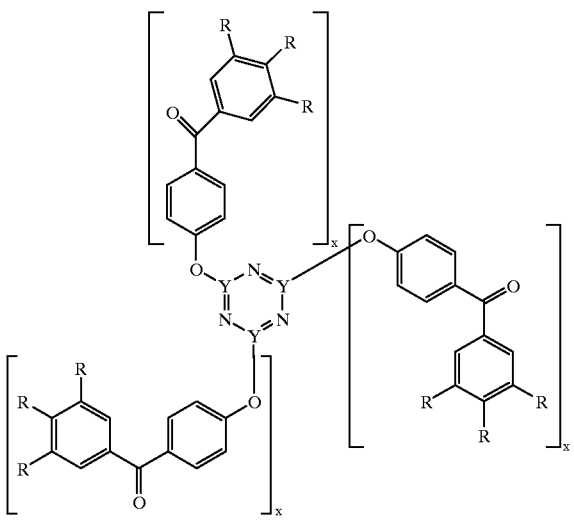

(II)

wherein: Y represents carbon or phosphorus, each R substituent independently represents hydrogen; $C_1$ to $C_6$ alkyl; $C_1$ to $C_6$ alkoxy; or halogen; and x is 1 or 2, with the proviso that when Y is carbon, x must equal 1 and when Y is phosphorus, x must equal 2.

Novel compounds according to formula (II) wherein Y represents carbon; x is 1; and R is defined as previously, are also provided by the present invention.

The compounds of formula (II) can be synthesized in at least three ways, although the routes vary in convenience and yield. 4-hydroxybenzophenone can be treated with 2,4,6-trichlorotriazine in the presence of potassium carbonate in refluxing xylenes to give moderate yields of the parent compound, which is readily recrystallized from toluene/ethyl acetate. A similar pathway that uses pyridine as both base and solvent gives fair yields of the fluoro-substituted compound. The simplest route is in situ formation of cyanogen bromide from bromine and sodium cyanide, addition of the 4-hydroxybenzophenone and triethylamine to give the aryl cyanate, and subsequent heating to yield the triazine. Furthermore, the addition of Lewis acids (e.g., $TiCl_4$) can be employed to accelerate the trimerization of the cyanate. This one-pot synthesis is tolerant of a variety of functionalities and provides good yields.

4-hydroxybenzophenones are available commercially (e.g,. Aldrich) and/or can be prepared by literature methods.

Preferably, about 0.01–25 weight % photocrosslinking agent, more preferably, about 0.1–10 weight %, and most preferably about 0.1–1.0 weight %, is employed based upon the total weight of the elastomer. In general, the amount of photocrosslinking agent employed is based upon the ease of hydrogen abstraction from the elastomeric polymer backbone, the reactivity of the radicals formed, the intensity and length of exposure of the composition to irradiation, and the elastomer's molecular weight and the desired final properties of the material.

Other useful materials which can be optionally utilized in the present invention include, but are not limited to, thermally expandable polymeric microspheres, glass microspheres, fillers, pigments, foaming agents, stabilizers, fire retardants, and viscosity adjusting agents which do not interfere with crosslinking.

In practice, the photocrosslinking agent and other ingredients are added to the elastomer, whereupon the material can be coated by methods well-known in the art, such as solvent coating, hot-melt coating, solventless or waterborne coating, and extrusion. The coating is then exposed to radiation, preferably electromagnetic radiation such as UV light, under conditions sufficient to effect crosslinking of the elastomer.

The photocrosslinkers of Formula (I) are preferably activated with long wavelength ultraviolet radiation (240–400 nm). The absorption maximum will depend on the molecular structure of the photocrosslinking agent. High intensity UV lights are preferably used for curing. Such UV lights, including the PPG UV processor and Fusion Systems curing unit, are commercially available. The PPG UV processor is equipped with two medium pressure mercury lamps which have a spectral output between 240 and 740 nm with emissions primarily in the 270 to 450 nm output range. The lamps can be set at full power (300 Watts/inch) or half power (150 watts/inch). The Fusion Systems Curing Unit uses UV lamps having a power supply of 300 watts/inch. A variety of bulbs are available with differing spectral outputs. The preferred bulbs for the photocrosslinking agents of the invention are the "D" or "H" bulbs, both commercially available from Fusion Systems Corp., Rockville, Md.

The radiation-crosslinked materials of the present invention are useful as sealants and coating materials, such as inks, adhesives, printing and photographic coatings, paints, semiconductor masks, release coatings, photoresists, and photodetackifiable adhesives.

Test Procedures

The following test procedures were used to evaluate the pressure-sensitive materials used in the examples.

Peel Adhesion

Peel adhesion is the force required to remove a coated flexible sheet material from a test panel measured at a specific angle and rate of removal. In the examples, this force is expressed in Newtons per decimeter (N/dm) width of coated sheet. The test follows the procedures found in ASTM D 3330–87 ("Peel Adhesion of Pressure Sensitive Tape at 180° Angle"). The only deviations from the ASTM test are the substitution of a glass plate for the steel plate called for in the test and a change in the peel rate. A glass test plate is washed with diacetone alcohol and cleaned with an absorbing material, such as a paper towel. The plate is then dried and washed three more times with heptane. A strip 0.127 dm in width of the sheet coated with the adhesive to be tested is applied to the horizontal surface of the cleaned glass test plate with at least 1.27 lineal dm in firm contact. Three passes in each direction with a 2 kg hard rubber roller is used to apply the strip. If air bubbles are entrapped between the test plate and the test strip, then the sample is discarded. The free end of the coated strip is doubled backed nearly touching itself so the angle of removal will be 180°. The free end is attached to the adhesion tester scale. The glass test plate is clamped in the jaws of a tensile testing machine which is capable of moving the plate away from the scale at a constant rate of 2.3 meters per minute. The dwell time after roll down is 30 seconds. The scale reading in Newtons is recorded as the tape is peeled from the glass surface. The data for the first 0.5 dm of the strip is disregarded and the peak, valley, and average peel is recorded for the remainder of the test strip.

Shear Strength

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in minutes required to pull a standard area of adhesive coated sheet material from a stainless steel test panel under stress of a constant, standard load. This test follows the procedure described in ASTM D 3645M-88: "Holding Power of Pressure Sensitive Adhesive Tapes."

The tests were conducted on strips of coated sheet material applied to a stainless steel panel which was cleaned and prepared as described above. A 0.127 dm by 0.127 dm portion of each strip was in firm contact with the panel with one end portion of the tape being free. The panel with the coated strip attached was held in a rack such that the panel formed an angle of 178° with the extended tape free end which was tensioned by application of a force of 1000 grams applied as a hanging weight from the free end of the coated strip. The 2° less than 180° is used to negate any peel forces, thus insuring that only the shear forces are measured, in an attempt to more accurately determine the holding power of the tape being tested. The time elapsed for each coated film to separate from the test panel was recorded as the shear strength. The type of failure, either "adhesive" failures when the adhesive separates cleanly from the panel or backing, or "cohesive" failures in which the sample adhesive leaves residue on both the test panel and backing, is recorded.

Gel Fraction

A known amount of polymer was put in an excess of a solvent capable of dissolving the polymer and allowed to dissolve over a 24 hr period. The sample was filtered and the recovered solid was washed a couple times with fresh solvent. The solid was dried and the amount recorded. The gel content was determined as follows:

$$\frac{\text{solid weight}}{\text{initial weight of sample}} \times 100\%$$

EXAMPLES

The following non-limiting examples further illustrate the present invention.

Abbreviations

Throughout this application the following abbreviations will be used for the different components:

| | |
|---|---|
| AA | acrylic acid |
| IOA | isooctyl acrylate |
| BP | benzophenone |
| C4EstBP | 1,4-butanedi[4-benzoylphenoxy]acetate |
| C5EBP | 1,5-bis(4-benzoylphenoxy)pentane |

Example 1

Preparation of C5EBP 4-hydroxybenzophenone (3000 g; 15.15 moles), NaOH (608 g; 15.15 moles) and ethylene glycol (5500 g) were placed in a 12 liter flask fitted with a condenser and mechanical stirrer. The reaction mixture was stirred at 85° C. until the 4-hydroxybenzophenone and the NaOH were dissolved. The reaction mixture was then set to 135° C. and 2000 g (8.6 moles) of 1,5-dibromopentane was added. Excess NaOH (80 g, 2.05 moles) was added in portions to maintain a basic pH. After heating for 1.5 hours, the reaction was essentially complete. The mixture was cooled by the addition of 2500 g water and the precipitated product was filtered from the ethylene glycol/water mixture. This tan, solid precipitate was then mixed with 3608 g ethyl acetate to purify the product. This ethyl acetate purification step was repeated and, following air drying, 2982 g of the purified C5EBP product was obtained.

Example 2

Preparation of Bis(benzophenone) Analogs

Bis(benzoplhenone) analogs of C5EBP were prepared in accordance with Example 1 by replacing the 1,5-dibromopentane with equimolar amounts of the following dibromo-substituted starting materials:

| Dibromo - reagent | Photocrosslinker formed |
|---|---|
| 1,9-dibromononane | C9EBP |
| 1,10-dibromodecane | C10EBP |
| 1,11-dibromoundecane | C11EBP |
| 1,3-bis(bromomethyl)benzene | mXEBP |
| 1,4-bis(bromomethyl)benzene | pXEBP |
| 1,4-dibromobutane | C4EBP |

Example 3

Preparation of 2,4,6-tri(4-benzoylphenoxy)-1,3,5-triazine (TBPT)

A 500 ml 3-neck Morton flask was equipped with mechanical stirring apparatus, a thermometer, and a pressure-equalizing addition funnel (PEAF). The flask was charged with 23.0 g bromine ($Br_2$, 144 mmole) and 75 ml distilled water ($H_2O$). While being stirred, the flask and contents were cooled to less than 0° C. with an external ice-salt water bath. The PEAF was charged with 7.00 g sodium cyanide (NaCN, 143 mmole) dissolved in 50 ml $H_2O$. The NaCN solution was added dropwise over 15 minutes to the vigorously stirred cold $Br_2$ solution so that the temperature remained less than 5° C. The brown $Br_2$ color was and replaced by a yellow color as the addition progressed. Stirring continued about 15 minutes past the end of addition, during which time the temperature fell to below 0° C. A mixture (slurry) of 26.75 g 4-hydroxybenzophenone (135 mmole) in 150 ml chloroform ($CHCl_3$) was added to the contents of the flask. The PEAF was recharged with 13.7 g triethylamine ($Et_3N$, 135 mmole), which was added dropwise over 15 minutes to the contents of the flask so that the temperature remained below 5° C. As the addition progressed, the white 4-hydroxybenzophenone dissolved and a yellow-orange color formed. The reaction mixture was stirred for 70 minutes below 0° C., then the cold bath was removed and the reaction allowed to warm to room temperature over 2.5 hours with continued stirring.

The stirring was then halted and two phases were separated. The $CHCl_3$ phase containing product was kept and the aqueous phase was isolated and extracted twice with 50 ml $CHCl_3$. The $CHCl_3$ portions were combined and placed into a 1 liter round-bottomed flask with a magnetic stirring bar. A reflux condenser topped with a nitrogen gas ($N_2$) inlet was attached, and the clear orange organic solution was stirred and refluxed under a flow of $N_2$.

The reaction was cooled to room temperature and then 250 ml of saturated aqueous sodium bicarbonate was added, and the mixture was stirred vigorously. The phases were then separated, and the organic phase was dried with anhydrous magnesium sulfate.

After gravity filtration, volatiles were removed in vacuo from the filtrate to leave 29.2 g crude 2,4,6-tri(4-benzoylphenozy)-1,3,5-triazine. Recrystallization from ethyl acetate-hexane allowed removal of residual 4-hydroxybenzophenone, yield: 13.3 g, white crystals.

Example 4

Preparation of 2,4,6-tri(4-benzoylphenoxy)-1,3,5-triazine (TBPT)

A magnetic stirring bar, 8.25 g 4-hydroxybenzophenone (41.6 mmole), 250 ml xylenes, 2.50 g cyanuric chloride (13.6 mmole), 2.90 g potassium carbonate (21.0 mmole), and another 150 ml xylenes were added to a 1 liter round-bottomed flask. A reflux condenser topped with a nitrogen gas ($N_2$) inlet was attached, and the mixture was refluxed with stirring under $N_2$. The reaction was cooled to room temperature, then 250 ml $H_2O$ was added, and the mixture was stirred vigorously. The phases were then separated, and the organic phase was washed with 250 ml half-saturated aqueous sodium bicarbonate. The organic phase was subsequently dried with anhydrous magnesium sulfate, gravity filtered, and the volatiles were removed from it in vacuo to leave 11.4 g brown oil that contained crude product 2,4,6-tri(4-benzoylphenoxy)-1,3,5-triazine and xylenes. This material was heated and triturated with ethyl acetate-hexane to afford a light tan powder that was isolated by suction filtration, then dried to give 4.80 g product.

Example 5

Preparation of 2,4,6-tri(4-(4-fluorobenzoyl) phenoxy)-1,3,5-triazine (TFBPT)

A magnetic stirring bar, 3.00 g 2,4,6-trichloro-1,3,5-triazine(cyanuric chloride, 16.3 mmole), 10.9 g 4-fluoro-4'-hydroxybenzophenone (50.4 mmole), and 100 ml dry pyridine (previously dried over activated 4A molecular sieves) were placed into a 250 ml round-bottomed flask. A reflux condenser topped with a nitrogen gas ($N_2$) inlet was attached, and the mixture was refluxed with stirring under $N_2$. At first an orange color formed, then the mixture became an opaque homogeneous black after an hour. The solution was cooled to room temperature and then poured into 700 ml $H_2O$. The liquids were decanted to leave a black solid that was dissolved in 100 ml $CHCl_3$. The $CHCl_3$ solution was dried with anhydrous magnesium sulfate, gravity filtered, and volatiles were removed in vacuo to leave 11.5 g black solid. This solid was recrystallized from ethyl acetate-hexane, including treatment with activated charcoal and decanting from an insoluble black viscous oil, to give upon cooling of the mother liquor to 0° C., 4.07 g whitish solid 2,4,6-tri(4-(4-fluorobenzoyl)phenoxy)-1,3,5-triazine.

Example 6

Preparation of 1,1,3,3,5,5-hexa(4-benzoylphenoxy)-1,3,5-cyclotriphosphazene derivative (HBPCTP)

(A) In a 1-liter flask were placed 36.0 gm 4-hydroxybenzophenone (182 mmole), 100 ml glyme, 20 ml toluene, 100 ml tetrahydrofuran, 10.0 gm phosphonitrilic chloride trimer (28.8 mmole), 45.0 ml triethylamine (445 mmole), and a magnetic stirring bar. The mixture was refluxed with stirring under nitrogen gas during which a white solid formed and the solution darkened. The reaction was cooled to room temperature and 750 ml water was added. The mixture was stirred vigorously, then 50 ml chloroform was added, and the phases were separated. The aqueous phase was washed with 3×250 ml chloroform, then the combined organic portions were dried with magnesium sulfate, gravity filtered, and rotary evaporated to leave 45.6 gm brown viscous oil. This material was dissolved in carbon tetrachloride, then suction filtered to remove solids. Volatiles were removed from the filtrate in vacuo to leave 42.0 brown oil. This oil was triturated with isopropyl alcohol and the brown liquid was decanted from the white solid that formed. This white solid was recrystallized from ethyl acetate to give 7.85 gm of white powder, the pure product.

(B) In a 1-liter flask were placed a magnetic stirring bar and 5.0 gm of a 50% by weight dispersion of sodium hydride in mineral oil (2.5 gm NaH, 100 mmole). The dispersion was washed with 110 ml toluene under $N_2$ to remove the mineral oil. This toluene was removed. 250 ml fresh toluene was added, followed by 18.0 gm 4-hydroxybenzophenone (90.8 mmole) and another 250 ml toluene. This mixture was refluxed with stirring under nitrogen gas to form the phenolate (a yellow-green color and suspension formed). 5.0 gm phosphonitrilic chloride trimer (14.4 mmole) was then added, and reflux with stirring under nitrogen gas was continued during which time the yellow-green color slowly discharged to be replaced by a white suspended solid. The reaction was cooled to room temperature, then 500 ml water was slowly and carefully added with vigorous stirring (gas evolution, exotherm). The phases were separated, and the organic phase was washed with 20 ml saturated aqueous sodium bicarbonate solution that had been diluted to 100 ml total volume by the addition of 80 ml water. The organic phase was then dried with magnesium sulfate, gravity filtered, and rotary evaporated to leave 21.6 gm viscous oil, which crystallized upon standing overnight. This solid was recrystallized from methanol-ethyl acetate-petroleum ether to give 16.9 gm pale straw-colored crystals, the desired product in 89% yield.

Comparative Example C-1

Preparation of 1,4-butane-di(4-benzoylphenoxy) acetate (C4EstBP)

This ester-linked benzophenone was prepared according to the method of PCT Patent Appln. No. WO 93/16131 (Everaerts et al.). In a first step, an ethyl-(4-benzoylphenoxy)acetate (EPBA) precursor was prepared by refluxing a mixture of 100.0 grams (0.51 moles) 4-hydroxybenizoplhenonie, 85.2 grams (0.51 moles) ethyl bromoacetate and 800 ml of 2-butanone (MEK) in the presence of an excess of potassium carbonate (209 grams or 1.5 moles). The carbonate was filtered off and the MEK removed on a rotovapor. The residue was crystallized from isopropyl alcohol to yield a white, flaky product with a sharp melting point of 82° C. The structure was confirmed by NoM.

In a second step, the comparative C4EstBP was prepared by mixing 10 grams (0.033 moles) of the EBPA with 1.6 grams (0.017 moles) of 1,4-butanediol. The mixture was then stirred with a magnetic bar. A few drops of methanesulfonic acid were added as a catalyst and the mixture was heated to 120° C. under constant agitation. When cooled and washed with isopropanol, a white solid was obtained, which was purified by crystallization from hot toluene. NMR analysis confirmed the structure of the product.

Examples 7–11 and Comparative Example C-2

The use and performance of several of the above radiation-activatable crosslinking agents in solvent borne acrylate adhesive systems are compared to the use of benzophenone (BP) in this set of examples. These acrylate adhesives were prepared according to the method of Re U.S. Pat. No. 24,906 (Ulrich), incorporated by reference herein, in ethyl acetate using the weight ratios of isooctyl acrylate (IOA) and acrylic acid (AA) specified in Table 1. The inherent viscosity (i.v. in dl/g) in ethyl acetate at 27° C. and the weight percent of carbon tetrabromide chain transfer agent (if present) used in these adhesive formulations is also listed in Table 1.

In each example, the photocrosslinker was dissolved in a 40 wt. % solution of the adhesive formulation in ethyl acetate. The mixture was coated on primed PET and then dried for 15 minutes at 65° C. to give 25 $\mu$m coatings. The films were UV cured by the use of a PPG high intensity UV processor with two lamps at full setting and conveyor speed at 75 fpm, then stored for 24 hours in a constant temperature room held at 22° C. and 50% relative humidity. Gel fraction for each example was measured as described above using ethyl acetate as the solvent. Shear strength was also measured at room temperature (22° C.) and the shear failure mode (c=cohesive failure, p=pop-off or adhesive failure, c/p=mixed) was observed. For some examples, peel adhesion was also measured as described above.

TABLE 1

| Ex. | IOA/AA | i.v. (dl/g) | CBr$_4$ (wt %) | Crosslinker (wt %) | Dose (mJ/cm$^2$) | Shear (min.) | Gel (%) | Peel (N/dm) |
|---|---|---|---|---|---|---|---|---|
| 7 | 90/10 | 1.03 | 0.1 | TBPT (0.1) | 0 | 18 c | 4 | — |
| 7 | 90/10 | 1.03 | 0.1 | TBPT (0.1) | 160 | 208 c | 22 | — |
| 7 | 90/10 | 1.03 | 0.1 | TBPT (0.1) | 320 | 10,000+ | 45 | — |
| 7 | 90/10 | 1.03 | 0.1 | TBPT (0.1) | 480 | 10,000+ | 54 | — |
| C-2 | 90/10 | 0.64 | 0.1 | BP (0.1) | 0 | 19 c | 1 | — |
| C-2 | 90/10 | 0.64 | 0.1 | BP (0.1) | 160 | 45 c | 8 | — |
| C-2 | 90/10 | 0.64 | 0.1 | BP (0.1) | 320 | 53 c | 17 | — |
| C-2 | 90/10 | 0.64 | 0.1 | BP (0.1) | 480 | 81 c | 26 | — |
| 8 | 90/10 | 0.64 | 0.1 | TBPT (0.1) | 0 | 18 c | 4 | — |
| 8 | 90/10 | 0.64 | 0.1 | TBPT (0.1) | 160 | 209 c | 22 | — |
| 8 | 90/10 | 0.64 | 0.1 | TBPT (0.1) | 320 | 10,000+ | 45 | — |
| 8 | 90/10 | 0.64 | 0.1 | TBPT (0.1) | 480 | 10,000+ | 54 | — |
| 9 | 90/10 | 0.64 | 0.1 | C5EBP (0.1) | 0 | 18 c | 3 | — |
| 9 | 90/10 | 0.64 | 0.1 | C5EBP (0.1) | 160 | 1521 c | 40 | — |
| 9 | 90/10 | 0.64 | 0.1 | C5EBP (0.1) | 320 | 10,000+ | 51 | — |
| 9 | 90/10 | 0.64 | 0.1 | C5EBP (0.1) | 480 | 10,000+ | 57 | — |
| 10 | 95/5 | 0.81 | 0.05 | TBPT (0.1) | 0 | 2 c | 3 | 76.8 |
| 10 | 95/5 | 0.81 | 0.05 | TBPT (0.1) | 160 | 2033 c | 55 | 69.0 |
| 10 | 95/5 | 0.81 | 0.05 | TBPT (0.1) | 320 | 865 p | 67 | 66.1 |
| 10 | 95/5 | 0.81 | 0.05 | TBPT (0.1) | 480 | 442 p | 72 | 56.7 |
| 11 | 95/5 | 0.81 | 0.05 | C9EBP (0.1) | 0 | 2 c | 5 | 75.3 |
| 11 | 95/5 | 0.81 | 0.05 | C9EBP (0.1) | 160 | 880 c | 59 | 62.8 |
| 11 | 95/5 | 0.81 | 0.05 | C9EBP (0.1) | 320 | 795 p | 69 | 57.6 |
| 11 | 95/5 | 0.81 | 0.05 | C9EBP (0.1) | 480 | 395 p | 74 | 54.5 |

Example 12 And Comparative Example C-3

This set of examples illustrates the improved performance of the radiation-activatable crosslinking agents of the present invention over those ester-linked bis-benzophenones disclosed in PCT Appln. No. WO 93/16131 (Everaerts et al.). 0.1 wt % of C5EBP (Example 12) and an equimolar amount (0.121 wt %) C4EstBP comparative Example C-3) were combined (same procedure as in Examples 7–11), pressed (cured with a Fusion Systemils UV processor using the "H" lamps at full setting), and tested in a 90/10 IOA/AA acrylic adhesive formulation containing 0.1% CBr$_4$ having an i.v. of 0.64 (dl/g). The results of gel fraction (in ethyl acetate) and shear strength testing of these examples are found in Table 2.

TABLE 2

| Ex. | IOA/AA | i.v. (dl/g) | CBr$_4$ (wt %) | Crosslinker (wt %) | Dose (mJ/cm$^2$) | Shear (min.) | Gel (%) |
|---|---|---|---|---|---|---|---|
| 12 | 90/10 | 0.64 | 0.1 | C5EBP (0.1) | 0 | 19 c | 0 |
| 12 | 90/10 | 0.64 | 0.1 | C5EBP (0.1) | 122 | 169 c | 13 |
| 12 | 90/10 | 0.64 | 0.1 | C5EBP (0.1) | 244 | 1987 c | 42 |
| 12 | 90/10 | 0.64 | 0.1 | C5EBP (0.1) | 366 | 4589 c | 47 |
| C-3 | 90/10 | 0.64 | 0.1 | C4EstBP (0.121) | 0 | 19 c | 0 |
| C-3 | 90/10 | 0.64 | 0.1 | C4EstBP (0.121) | 122 | 56 c | 4 |
| C-3 | 90/10 | 0.64 | 0.1 | C4EstBP (0.121) | 244 | 205 c | 10 |
| C-3 | 90/10 | 0.64 | 0.1 | C4EstBP (0.121) | 366 | 483 c | 26 |

As shown in Table 2, the crosslinking agents of the present invention possess not only the advantage of a direct synthesis from commonly available materials over the bis (benzophenone) compositions found in PCT Appln. No. WO 93/16131 (Everaerts et al.), but also can provide greater efficiencies and performance in crosslinked materials.

Example 13 and Comparative Example C-4

A natural rubber-based adhesive composition was prepared by combining 50 parts natural rubber (a CV-60 Standard Malaysian Rubber (SMIR) natural rubber), 50 parts by weight styrene-butadiene rubber (SBR 1011 A, commercially available from Ameripol/Synpol), 50 parts by weight Irganox™ 1010 (a multi-functional hindered phenol antioxidant, commercially available from Ciba-Geigy Corp.), and 1 part by weight C5EBP (Example 13) and an equimolar amount (0.121 wt %) C4EstBP (Comparative Example C-4) to 25 wt. % solids in toluene. These mixtures were then coated on a primed polyester film and dried to a thickness of 25 μm, and then UV cured by the use of a Fusion Systems UV processor using the "H" lamps at full setting and conveyor speed at 75 fpm. These cured samples were then stored for 24 hours in a constant temperature room held at 22° C. and 50% relative humidity. Gel determination for each example was performed as described above using toluene as the solvent. The results of these tests are found in Table 3.

TABLE 3

| Ex. | Crosslinker (wt %) | Dose (mJ/cm$^2$) | Gel (%) |
|---|---|---|---|
| 13 | C5EBP (0.1) | 122 | 33 |
| 13 | C5EBP (0.1) | 244 | 39 |
| 13 | C5EBP (0.1) | 366 | 52 |
| C-4 | C4EstBP (0.121) | 122 | 27 |
| C-4 | C4EstBP (0.121) | 244 | 35 |
| C-4 | C4EstBP (0.121) | 366 | 41 |

Again, the ether-linked photocrosslinker used in the present invention crosslinked the elastomeric formulation more efficiently than the ester-linked materials of PCT Appln. No. WO 93/16131.

Examples 14 and 15

Formulations of 0.1 wt. % C4EBP (Example 14) and C10EBP (Example 15) in 70:30 by weight poly(octene) (having an i.v. of 2 deciliters/g). Regalrez™ 1126 (a tackifying resin commercially available from Hercules Inc.) were evaluated. Samples were solution coated from toluene, dried to a coating thickness of 25 μm, and then UV cured by the use of a PPG UV processor with two lamps at full setting and conveyor speed at 75 fpm. These cured samples were then stored for 24 hours in a constant temperature room held at 22° C. and 50% relative humidity. Gel determination for each example was performed as described above using toluene as the solvent. Shear strength was also measured at room temperature (22° C.) and the shear failure mode (c=cohesive failure, p=pop-off or adhesive failure c/p= mixed) was observed. The results of these tests are found in Table 4.

TABLE 4

| Ex. | Crosslinker (wt %) | Dose (mJ/cm$^2$) | Shear (min.) | Gel (%) |
|---|---|---|---|---|
| 14 | C4EBP (0.1) | 0 | 69 c | 2 |
| 14 | C4EBP (0.1) | 160 | 546 c/p | 34 |
| 14 | C4EBP (0.1) | 320 | 10,000 | 44 |
| 14 | C4EBP (0.1) | 480 | 1108 p | 48 |
| 15 | C10EBP (0.1) | 0 | 65 c | 4 |
| 15 | C10EBP (0.1) | 160 | 854 c | 36 |
| 15 | C10EBP (0.1) | 320 | 10,000 | 45 |
| 15 | C10EBP (0.1) | 480 | 10,000 | 47 |

Examples 16–17

This set of examples illustrates the use of photocrosslinkers of the present invention having aralkyl spacer segments. 0.1 wt % of mXEBP (Example 16) and pXEBP (Example 17) were combined, processed, and tested in the same manner as in Examples 7–11 in a 90/10 IOA/AA acrylic adhesive formulation having an i.v. of 0.64 (dl/g). The results of gel fraction (in ethyl acetate) testing of these examples are found in table 5.

TABLE 5

| Ex. | IOA/AA | i.v. (dl/g) | CBr$_4$ (wt %) | Crosslinker (wt %) | Dose (mJ/cm$^2$) | Gel (%) |
|---|---|---|---|---|---|---|
| 16 | 90/10 | 0.64 | 0.1 | mXEBP (0.1) | 0 | 0 |
| 16 | 90/10 | 0.64 | 0.1 | mXEBP (0.1) | 122 | 9 |
| 16 | 90/10 | 0.64 | 0.1 | mXEBP (0.1) | 244 | 38 |
| 16 | 90/10 | 0.64 | 0.1 | mXEBP (0.1) | 366 | 47 |
| 17 | 90/10 | 0.64 | 0.1 | pXEBP (0.1) | 0 | 0 |
| 17 | 90/10 | 0.64 | 0.1 | pXEBP (0.1) | 122 | 8 |
| 17 | 90/10 | 0.64 | 0.1 | pXEBP (0.1) | 244 | 35 |
| 17 | 90/10 | 0.64 | 0.1 | pXEBP (0.1) | 366 | 39 |

Example 18

This set of examples illustrates the use of a polyfunctional photocrosslinker of invention having a heteroaromatic spacer segment. 0.1 wt % of HBPCTP was combined, processed and tested in the same manner as Examples 7–11 in a 90/10 IOA/AA acrylic adhesive formulation containing 0.1 wt % CBr$_4$ having an i.v. of 0.64 (dl/g), except that a Fusion Systems UV processor using the "H" lamps at full setting was employed. The results of gel fraction (in ethyl acetate) and shear strength testing of these examples are found in Table 6.

TABLE 6

| Ex. | IOA/AA | i.v. (dl/g) | CBr$_4$ (wt %) | Crosslinker (wt %) | Dose (mJ/cm$^2$) | Shear (min.) | Gel (%) |
|---|---|---|---|---|---|---|---|
| 18 | 90/10 | 0.64 | 0.1 | HBPCTP (0.1) | 122 | 275 | 33 |
| 18 | 90/10 | 0.64 | 0.1 | HBPCTP (0.1) | 244 | 10,000 | 65 |
| 18 | 90/10 | 0.64 | 0.1 | HBPCTP (0.1) | 366 | 10,000 | 70 |

Example 19

A formulation of 0. 1 wt. % C10EBP in Budene™1207 (polybutadiene rubber commercially available from Firestone Inc.) was evaluated. Samples were solution-coated from toluene, dried to a coating thickness of 25 μm, and then UV cured by the use of a PPG high intensity UV processor with two lamps at full setting and conveyor speed at 75 fpm. These cured samples were then stored for 24 hours in a constant temperature room held at 22° C. and 50% relative humidity. Gel determination for each example was performed as described above using toluene as the solvent. The results of these tests are found in Table 7.

TABLE 7

| Ex. | Crosslinker (wt %) | Dose (mJ/cm$^2$) | Gel (%) |
|---|---|---|---|
| 19 | C10EBP (0.1) | 0 | 3 |
| 19 | C10EBP (0.1) | 160 | 35 |
| 19 | C10EBP (0.1) | 320 | 56 |
| 19 | C10EBP (0.1) | 480 | 64 |

Examples 20–22

This set of examples illustrates the use of the photo-crosslinkers of the present invention (C5EBP) in an acrylic pressure-sensitive adhesive to form a photodetackifiable adhesive. In each example, the photocrosslinker was dissolved in a 40 wt. % solution of the adhesive formulation in tetrahydrofuran. These mixtures were coated PET and then dried for 15 minutes at 65° C. to give 25 μm coatings. The films were UV cured by the use of a PPG high intensity UV processor with two lamps at full setting and conveyor speed at 75 fpm, then stored for 24 hours in a constant temperature room held at 22° C. and 50% relative humidity. Peel adhesion measurements were then made for these samples as indicated above. The results of these peel adhesion tests are found in Table 8.

TABLE 8

| Ex. | IOA/AA | i.v. (dl/g) | Crosslinker (wt %) | Dose (mJ/cm$^2$) | Peel (N/dm) |
|---|---|---|---|---|---|
| 20 | 90/10 | 0.70 | C5EBP (1.0) | 0 | 56.9 |
| 20 | 90/10 | 0.70 | C5EBP (1.0) | 200 | 24.1 |
| 20 | 90/10 | 0.70 | C5EBP (1.0) | 600 | 19.7 |
| 21 | 90/10 | 0.70 | C5EBP (2.0) | 0 | 50.3 |
| 21 | 90/10 | 0.70 | C5EBP (2.0) | 200 | 12.7 |
| 21 | 90/10 | 0.70 | C5EBP (2.0) | 600 | 12.3 |
| 22 | 90/10 | 0.70 | C5EBP (4.0) | 0 | 52.5 |
| 22 | 90/10 | 0.70 | C5EBP (4.0) | 200 | 8.1 |
| 22 | 90/10 | 0.70 | C5EBP (4.0) | 600 | 10.1 |

Reasonable variations and modifications are possible from the foregoing disclosure without departing from either the spirit or scope of the present invention as claimed.

We claim:

1. A radiation-crosslinkable composition comprising:
  (a) an elastomeric polymer containing abstractable hydrogen atoms in an amount sufficient to enable the elastomeric polymer to undergo crosslinking in the presence of a suitable radiation activatable crosslinking agent; and
  (b) a radiation-activatable crosslinking agent of the formula:

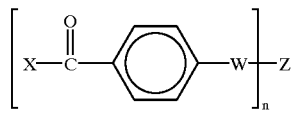

wherein:
  X represents CH$_3$—; phenyl; or substituted-phenyl, or substituted-phenyl with the proviso that any substituents on the substituted-phenyl do not interfere with the light-absorbing capacity of the radiation-activatable crosslinking agent and do not promote intramolecular hydrogen abstraction of the radiation activatable crosslinking agent;
  W represents —O—, —NH—, or —S—;
  Z represents an organic spacer selected from the group consisting of aliphatic, aromatic, aralkyl, heteroaromatic, and cycloaliphatic groups free of esters, amides, ketones, urethanes, and also free of ethers, thiols, allylic groups, and benzylic groups with hydrogen atoms intramolecularly accessible to the carbonyl group of said radiation-activatable crosslinking agent; and
  n represents an integer of 2 or greater.

2. A radiation-crosslinkable composition according to claim 1 wherein the elastomeric polymer is a macromolecular material that returns rapidly to its approximate initial dimensions and shape after substantial deformation by a weak stress and subsequent release of that stress as measured according to ASTM D 1456-86.

3. The radiation-crosslinkable composition according to claim 1 wherein said elastomeric polymer is selected from the group consisting of styrene-butadiene rubber; styrene-isoprene-styrene block copolymer; styrene-butadiene-styrene block copolymer; ethylene-propylene-diene monomer rubber; polyisobutylene; natural rubber; synthetic polyisoprene; acrylonitrile-butadiene copolymers; polychloroprene; ethylene-vinylacetate copolymer; silicones; polyacrylates; polybutadiene; poly(α-olefins), poly(vinyl ethers); poly(vinyl esters); and polymethacrylates.

4. The radiation-crosslinkable composition according to claim 3 wherein said elastomeric polymer is selected from the group consisting of natural rubber; polybutadiene; polyisoprene; styrene-butadiene-styrene block copolymer; and styrene-isoprene-styrene block copolymer; polyacrylates; and polymethacrylates.

5. The radiation-crosslinkable composition according to claim 1 wherein said radiation-activatable crosslinking agent is present in an amount of from 0.01–25 weight percent, based upon the total weight of said elastomeric polymer.

6. The radiation-crosslinkable composition according to claim 1 wherein said radiation-activatable crosslinking agent is present in an amount of from 0.1–10 weight percent, based upon the total weight of said elastomeric polymer.

7. The radiation-crosslinkable composition according to claim 1 further comprising additives selected from the group consisting of: thermally expandable polymeric microspheres; glass microspheres; pigments; foaming agents; stabilizers; fire retardants; and viscosity adjusting agents.

8. A radiation-crosslinkable composition comprising:
(a) an elastomeric polymer containing abstractable hydrogen atoms in an amount sufficient to enable the polymer to undergo crosslinking in the presence of a suitable radiation-activatable crosslinking agent; and
(b) a radiation-activatable crosslinking agent of the formula:

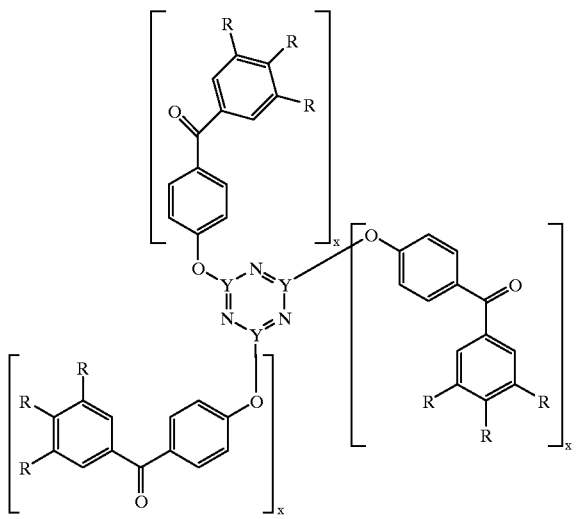

(II)

wherein: each R substituent independently represents hydrogen; $C_1$ to $C_6$ alkyl; $C_1$ to $C_6$ alkoxy; or halogen; Y represents carbon or phosphorus and; x is 1 or 2, with the proviso that when Y is carbon, x is 1 and when Y is phosphorus, x is 2.

9. The radiation-crosslinkable composition according to claim 8 wherein Y is carbon and x is 1.

10. The radiation-crosslinkable composition according to claim 8 wherein Y is phosphorus and x is 2.

11. The radiation-crosslinkcable composition according to claim 1 wherein X is phenyl; W is oxygen; Z is $-(CH_2)_{2-12}$; and n is 2.

12. A radiation-crosslinked composition prepared by the process of subjecting the radiation-crosslinkable composition of claim 1 to radiation in an amount sufficient to abstract hydrogen atoms from said elastomeric polymer by the resulting radiation-activated crosslinking agent.

13. A radiation-crosslinked elastomeric composition according to claim 11 wherein said radiation is electromagnetic radiation.

14. A radiation-crosslinked elastomeric composition according to claim 11 wherein said radiation has a wavelength in the range of about 240 to 400 nm.

15. A radiation-crosslinked composition prepared by the process of subjecting the radiation-crosslinkable composition of claim 8 to radiation in an amount sufficient to abstract hydrogen atoms from said elastomeric polymer by the resulting radiation-activated crosslinking agent.

16. A radiation-crosslinked composition prepared by the process of subjecting the radiation-crosslinkable composition of claim 11 to radiation in an amount sufficient to abstract hydrogen atoms from said elastomeric polymer by the resulting radiation-activated crosslinking agent.

* * * * *

UNITED STATES PATENT AND TRADEMARK OFFICE
CERTIFICATE OF CORRECTION

PATENT NO. : 6,369,123 B1
DATED : April 9, 2002
INVENTOR(S) : Stark, Peter A.

It is certified that error appears in the above-identified patent and that said Letters Patent is hereby corrected as shown below:

Column 2,
Line 15, after "reaction" delete the first instance of "of this".

Column 5,
Line 13, "photocrosslinkinig" should read -- photocrosslinking --.
Line 19, "elastomners" should read -- elastomers --.

Column 12,
Line 65, "4-hydroxybenizoplhenonie" should read -- 4-hydroxybenzophenone --.

Column 13,
Line 5, "NoM" should read -- NMR --.

Column 14,
Line 59, "comparative Example C-30" should read -- (Comparative Example C-3) --.
Line 61, "pressed" should read -- processed --.
Line 61, "Systemils" should read -- Systems --.

Column 15,
Line 62, before "Regalrez™" delete "." and insert -- : --.

Column 16,
Line 39, "presentinvention" should read -- present invention --.

Column 17,
Line 42, before "PET" insert -- on primed --.

Column 18,
Lines 43 and 53, after "of" insert -- : --.

UNITED STATES PATENT AND TRADEMARK OFFICE
CERTIFICATE OF CORRECTION

PATENT NO. : 6,369,123 B1
DATED : April 9, 2002
INVENTOR(S) : Stark, Peter A.

It is certified that error appears in the above-identified patent and that said Letters Patent is hereby corrected as shown below:

<u>Column 20,</u>
Line 3, delete ";" after "and".
Line 10, "radiation-crosslinkcable" should read -- radiation-crosslinkable --.

Signed and Sealed this

Fifteenth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,369,123 B1
DATED          : April 9, 2002
INVENTOR(S)    : Stark et al.

It is certified that error appears in the above-identified patent and that said Letters Patent is hereby corrected as shown below:

<u>Title page,</u>
Item [*], Notice, delete "0" and insert -- 1016 --.

Signed and Sealed this

First Day of July, 2003

JAMES E. ROGAN
*Director of the United States Patent and Trademark Office*